Figure 1:
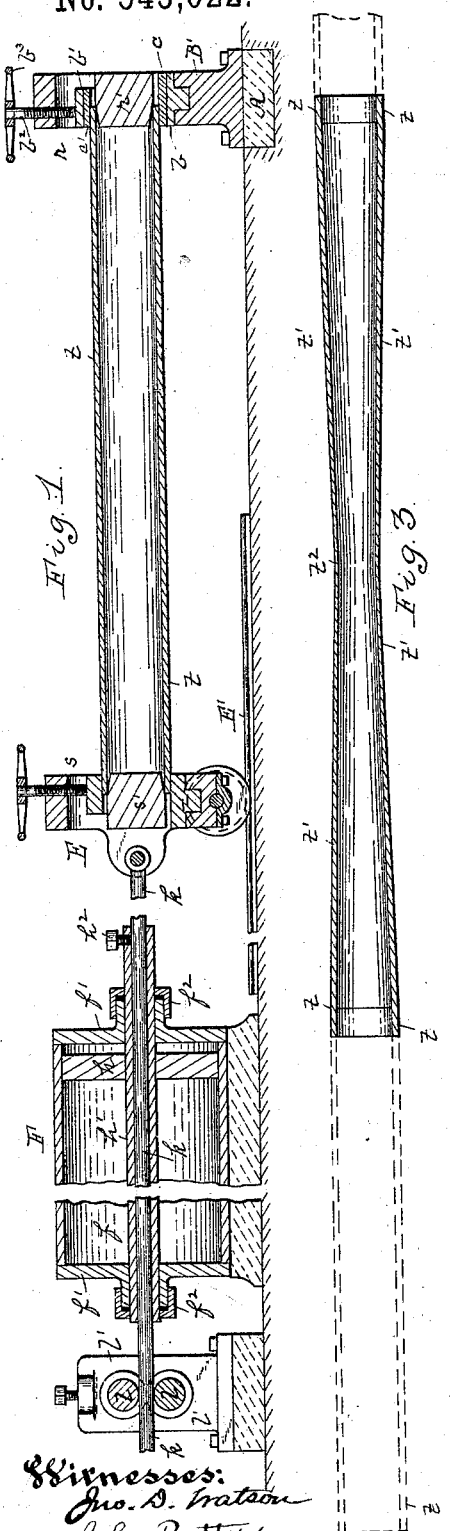

(No Model.) 2 Sheets—Sheet 1.
W. JACKSON.
MANUFACTURE OF TAPERED WROUGHT METAL TUBING.
No. 545,022. Patented Aug. 20, 1895.

Witnesses:
Jno. D. Watson
John Patterson

Inventor:
William Jackson.
By Kay, Totten & Cooke,
Attorneys.

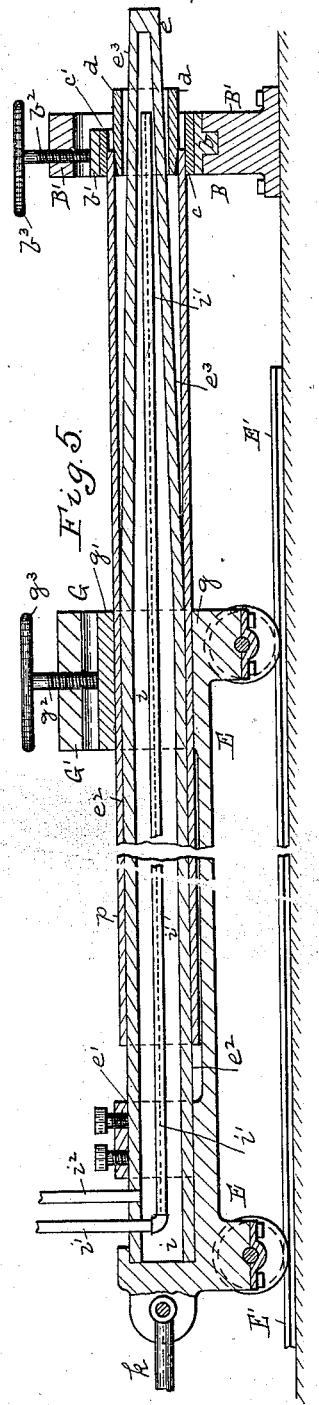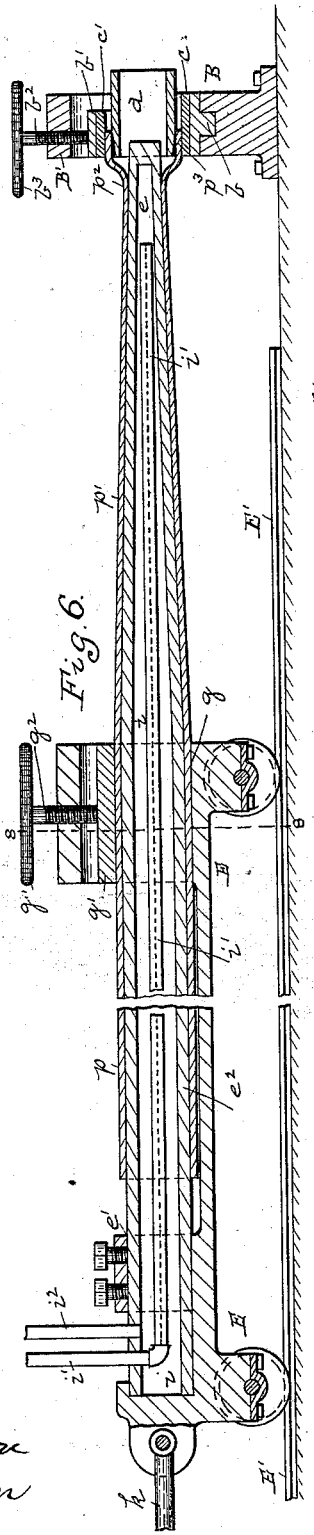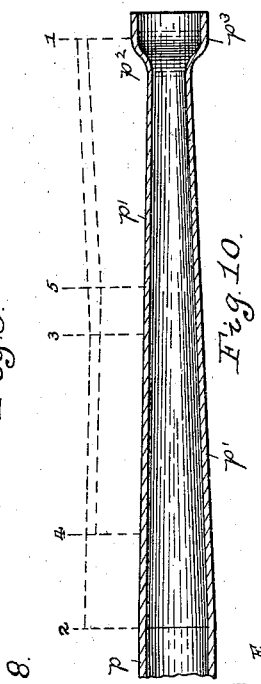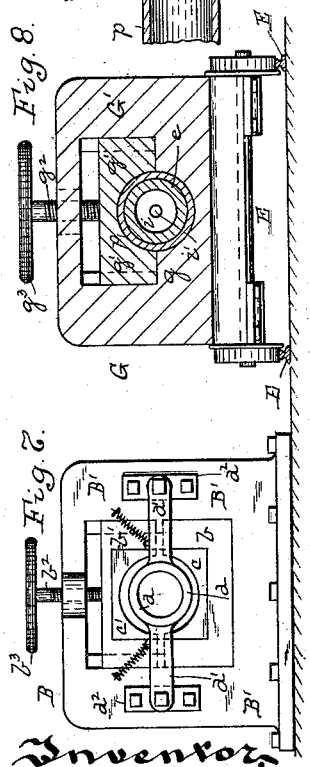

UNITED STATES PATENT OFFICE.

WILLIAM JACKSON, OF PITTSBURG, ASSIGNOR OF ONE-HALF TO ROBERT S. STEPHENSON, OF ECONOMY, PENNSYLVANIA.

MANUFACTURE OF TAPERED WROUGHT-METAL TUBING.

SPECIFICATION forming part of Letters Patent No. 545,022, dated August 20, 1895.

Application filed July 26, 1892. Serial No. 441,263. (No model.)

*To all whom it may concern:*

Be it known that I, WILLIAM JACKSON, a resident of Pittsburg, in the county of Allegheny and State of Pennsylvania, have invented a new and useful Improvement in the Manufacture of Tapered Wrought-Metal Tubing; and I do hereby declare the following to be a full, clear, and exact description thereof.

My invention relates to the manufacture of tapered wrought-metal tubing, its object being to provide an efficient method of forming the same in which as the tube is tapered it is also elongated and its walls thinned, so lightening that portion of the tube and reducing the cost of manufacture in proportion to the length of the tube formed. The ordinary tapered wrought-metal tubing has been made by the swaging operation in which the metal was forced inwardly and the walls of the tapered portion of the tube thickened, though there was comparatively little elongation of the tube in the operation, and as a result the tube contained as much metal and was as heavy in the tapered portion, because of the thickening of its walls, as it was in the portion remaining of the original diameter. The swaging operation was slow, and, as it did not elongate the tube, the cost of the tapered or reduced portion was as great as the body of the tube of original diameter plus the cost of reducing the same. For trolley-poles, electric poles, and other like purposes it has been considered desirable to form a tube having a gradual taper and having the walls of the tapered portion reduced in thickness, as it was not necessary to have as great a body of metal in the reduced portion; but such tube has not heretofore been produced. I am enabled by the present invention to produce a tube having such features by a rapid and inexpensive method, and also to elongate the tube at the same time and so utilize the metal to form from a comparatively short blank a comparatively long tapered tube.

To these ends my invention consists, generally stated, in forming a tapered tube by grasping and holding a heated tube at two different points, and then drawing the same longitudinally, which action causes the reduction of the diameter of the tube and the thinning of the walls thereof, so that that portion of the tube is formed gradually tapering and at the same time the tube is elongated and its walls reduced in thickness.

It also consists in carrying out the above steps around a tapering mandrel, around which the tube may be drawn and which acts to chill and set the tube in the parts brought in contact therewith, so that the form to be imparted to the tube may be controlled, and by so setting the metal at such points and changing the points between which the tube is drawn one end of the tube may be in this manner tapered and elongated, as hereinafter described.

It also consists in certain other improvements in the method of manufacture and in the apparatus employed for manufacturing the tapered tube, as hereinafter more particularly set forth and claimed.

To enable others skilled in the art to practice my invention I will describe the same more fully, referring to the accompanying drawings, in which—

Figure 3:
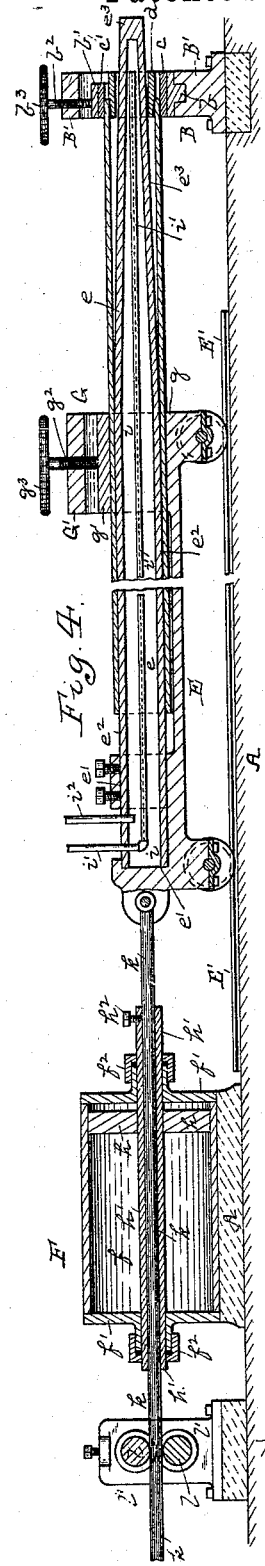
Figure 2:
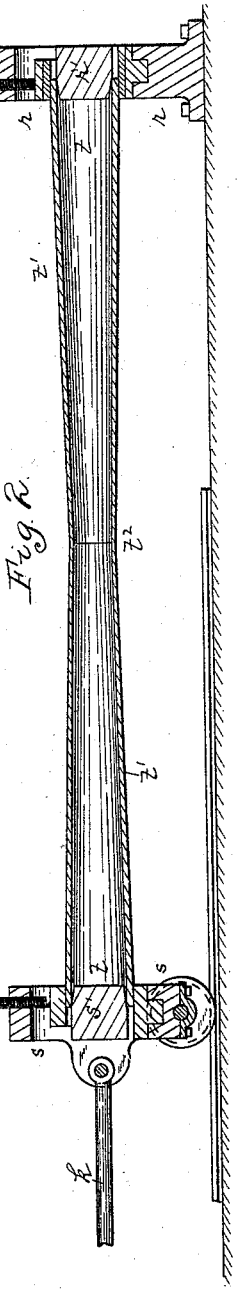
Figure 4:
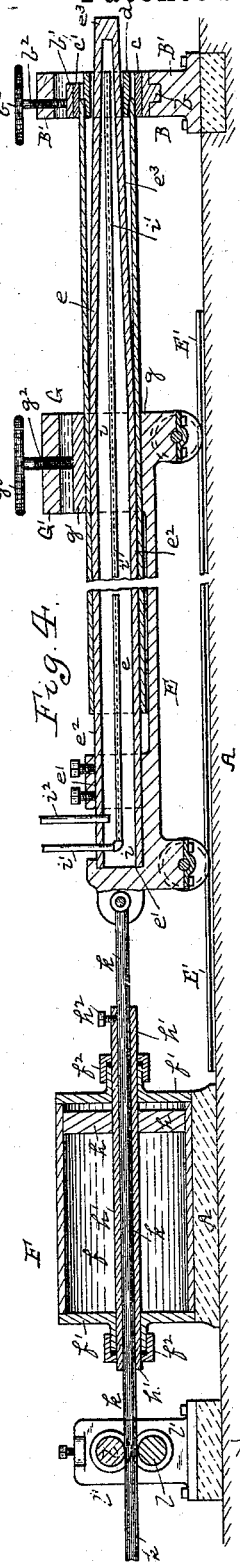

Figure 1 is a longitudinal section of the apparatus suitable for practicing the same, showing the position of the parts before the drawing operation takes place. Fig. 2 is a like view showing the position of the parts at the end of the drawing operation. Fig. 3 is a sectional view of the finished drawn tube as formed on such apparatus. Fig. 4 is a sectional view of the apparatus for practicing the invention with an internal former. Figs. 5 and 6 are enlarged sectional views of such apparatus, showing the positions before and after drawing. Fig. 7 is an end view of the clamping apparatus employed to hold one end of the tube. Fig. 8 is a cross-section on the line 8 8, Fig. 6. Fig. 9 shows the tube produced in the drawing operation of Figs. 5 and 6, and Fig. 10 is a diagram view illustrating such operation on the tube.

Like letters of reference indicate like parts in each view.

In describing the apparatus employed in practicing my invention I will first refer to apparatus in which no internal tapering or forming mandrel is employed, such form being the most simple form of apparatus embodying the invention, and I will afterward describe the apparatus when employed with the internal mandrel.

Upon a suitable bed A, I mount a clamping apparatus B, by which the end of the tube to be operated upon is held, such clamping apparatus having the lower jaw $b$, mounted in the housing B′, which is preferably stationary, and the upper jaw $b'$, which is mounted in the guideways and operated by a clamping-screw or like clamping device, as at $b^2$, by means of a suitable handle $b^3$. The clamping-jaws have dies $c$ $c'$, which correspond to the exterior of the tube, and are adapted to clamp the tube around the mandrel $e$, and as the clamp shown is arranged to hold one end of the tube the die $d$ is connected to the housing B′ at the rear part thereof, being shown in the drawings as hung by means of the straps $d'$, to which it is hinged, which straps are connected to brackets $d^2$, secured to the housing, so as to permit a slight vertical movement to the mandrel $e$, which is inserted within the tube, and which can in this way be forced down upon the lower die $c$, so that the upper clamping-jaw may take a firm hold around the entire tube. The die $d$ may be slightly tapering, so that it can pass easily within the tube, while the dies $c$ $c'$ may be forced down upon the tube and slightly flatten the same in taking the firm hold necessary, so providing for the proper holding of the tube and preventing the binding of the tube upon the mandrel by shrinking action. The die $d$ is formed hollow, as shown, to permit the tapering mandrel or former $e$ to pass through the same, and so enable me to employ a long mandrel sufficient to provide a former of practically the length of the portion of the tube to be tapered. The mandrel $e$ is supported on the carriage E, which is longitudinally movable, and is illustrated as running upon a track E′ upon the bed A, and so providing for the passage of the mandrel or former into the tube the desired distance. This carriage may be operated by any suitable machinery of sufficient power for the purpose, that shown being by means of a hydraulic cylinder F, the construction of which is described hereinafter. The mandrel $e$ is connected to the carriage E at any suitable point, such as at $e'$, and part thereof is made straight, as at $e^2$, to enter the end of the tube and give hold to the clamp, while part thereof is made tapering, as at $e^3$, the tapering portion being of the required length, according to the tapering and the desired elongation of the tube. For example, supposing that a six-inch tube is to be reduced to four inches at its smallest point, the taper of the mandrel will correspond to such measurements and the degree of taper to the length of the elongation or stretching to be imparted to the tube.

It will be understood that it is necessary to clamp the tube at a suitable point, so as to hold it during the stretching or elongation thereof, and for this purpose I provide the clamping mechanism G, which is located so as to extend back from the point at which the taper of the tube commences over the straight portion $e^2$ of the mandrel, the mandrel having clamping-jaws $g$ $g'$, the upper jaw $g'$ being operated by the clamping-screw $g^2$ or other clamping device, the screw shown having the handle $g^3$.

It will be understood, of course, that both the mandrel $e$ and the dies of the clamp G may be made interchangeable, according to the size of the tubing to be operated upon, in the same way, as above described, as the dies $c$ $c'$ of the clamp B. The housing G′ of the clamp G is carried on the carriage E, as more fully shown in Figs. 5 and 8.

In order to provide for the quick chilling of the tube when brought in contact with the mandrel, I prefer to cool the same by means of water or other suitable fluid, and for that purpose form the mandrel hollow, as at $i$, and support within it the tube $i'$, which extends out toward the front end thereof, suitable hose connections being made with the pipe $i'$ for feeding the water to the hollow mandrel and like connections being made to the pipe $i^2$ for carrying off the discharge.

The mechanism shown for drawing the carriage is a hydraulic cylinder, as above stated, though any suitable power mechanism may be employed. In the mechanism illustrated the cylinder $f$ is mounted upon the bed A and is provided with the cylinder-heads $f'$, having stuffing-boxes $f^2$, and the piston $h$ has a hollow piston-rod $h'$, which extends through such stuffing-boxes on either side of the cylinder, the cylinder, of course, having suitable supply and discharge connections for operating the same, which it is not considered necessary to illustrate. Extending back from the carriage E, above described, is the rod or bar $k$, which passes through the hollow piston-rod $h'$ and at the opposite end passes through the rolls $l$, mounted in the housing $l'$. These rolls are power operated and arranged to be reversed in practically the same way as the operating-rolls of the mandrel of tube-welding apparatus, any such mandrel-operating mechanism being suitable for the present purpose; and the object of the mechanism is to provide for the quick and easy adjustment of the parts ready to apply the power necessary for drawing and forming the tubing. To connect the bar $k$ with the piston I provide a suitable screw $h^2$, passing through the hollow piston and either at the forward or rear end thereof, as may be desired, and by which the bar $k$ and piston may be rigidly connected to provide for the application of the power generated in the hydraulic apparatus for the drawing of tubing.

Generally stated, the above apparatus includes all the features of mechanism necessary for practicing the invention, and it will be understood that the parts are brought closer together and the taper of the mandrel is made rather more abrupt than it would be in the practical machine in order to illustrate on a small drawing the invention to be practiced.

In forming the tapered tubing with the above apparatus the tube is taken at a high heat suitable for the purpose, preferably at about a welding heat or near thereto, where the particles of metal of the tube will move over each other easily—such, for example, as just after the welding operation—and one end of the tube is passed over the mandrel $d$ and secured within the clamp B, the carriage E having been run back out of the way and only a few inches of tubing being passed over the mandrel $e$, such as will give sufficient hold for the clamp. The carriage E is then forced forward by the rod $k$ by means of the rolls until the mandrel $e$ enters within the heated tube the desired distance, so as to bring the clamp G to the point from which the tapered portion is to commence. For example, in a six-inch pipe, twenty feet long, eight feet of which is desired to be straight, while the remainder is to be tapered, the mandrel will be run into the pipe for a distance sufficient to bring the forward end of the clamp G eight feet from the rear end of the pipe, leaving about twelve feet between the clamp B and the clamp G, and the pipe is then grasped by the clamp G and the mechanism is ready for the drawing operation. The bar $k$ and piston $h$ are then connected, and by admitting the fluid to the hydraulic cylinder the carriage with its clamp G is drawn away from the clamp B. As this drawing operation continues, the metal will, through such drawing operation, be reduced in diameter, the walls within corresponding to the amount of reduction, it being found that a very material reduction in the diameter and proper tapering of the pipe may be obtained in this way. As the drawing continues, the pipe is drawn down upon the former $e$, and when brought in contact therewith the former chills the metal and sets it around the former, and when the metal becomes chilled at that point that portion ceases to be acted upon and the points between which the drawing and tapering action takes place are advanced along the former as the metal is brought in contact therewith, the metal setting around the former as the carriage moves back, and as a result the tube is gradually tapered and at the same time its walls are correspondingly thinned until the desired taper and length of tube are obtained. The shape of the resultant tube formed will be about such as shown in Fig. 6, the portion $p$ of the tube being straight, while the portion $p'$ is tapering and then rises, as at $p^2$, up to the portion $p^3$, which was held by the clamp B.

That the operation may be more clearly understood it is well to state that in the drawing operation the tube is brought to its smallest diameter at a point midway between the points where it is held or clamped. For example, in the first of the drawing operations, where the metal is held between the points 1 2, the first place of greatest reduction would be at the point 3 about on the line 1 2 1 3 3 2. As, however, the metal of the tube near the clamp G is brought down upon the mandrel and chilled thereby, the point of holding will be advanced gradually to the point 4, and in such case, as the metal is brought in contact with the tube in continuing the drawing thereof, the point between which the stretching operation takes place is gradually advanced until it comes close to the point 1, such as at the point 6, in which case the point of greatest reduction would be about midway between the line 1 6, so that while the former $e$ imparts the desired form to the pipe by chilling and setting the metal, as above stated, it provides for the drawing of the taper toward the end of the pipe, so that very little of the metal is wasted at the forward end thereof.

As soon as the drawing operation is completed, the clamp G is opened and the mandrel drawn out of the tube, for which purpose it may be necessary to employ the power of the hydraulic cylinder to start the mandrel, after which the bar $k$ is disengaged from the piston $h'$, and the rolls $l$ may draw back the mandrel and the pipe be released from the clamp B. The end of the pipe which was held by the clamp B, such as the portion $p^3$ and part or all of the portion $p^2$, may be cut from the pipe, so forming the finished tapered tube. For some purposes, however, the enlarged end will be found desirable—such, for example, as for electric poles—and may be allowed to remain upon the tube.

In forming tubing without any interior mandrel, such as by the apparatus shown in Fig. 1, I grasp the heated tube $t$ by the two clamps $r$ $s$, employing, of course, interior mandrels $r'$ $s'$, which give hold to such clamps, and one or both clamps are then drawn longitudinally, in which case the tube will be gradually stretched and reduced in diameter at approximately an even taper toward the central point between the two clamps, as illustrated in Fig. 2, and as a result two tapered portions approaching each other will be formed, and after the completion of the drawing operation the tube may be removed from the apparatus and sawed where said tapers meet, so forming the two tapered portions at one time—for example, the tapered portions $t'$ $t'$ meeting at the point $t^2$, at which point they may be separated, so forming from the single length of tubing the two lengths of tapered tubing. This manner of practicing the invention is applicable to the formation of tubular-metal wagon tongues, shafts, and other articles. If desired, in forming the double taper, as above described, I may employ the tapered formers or mandrels, which will enter within the tubes until they meet each other, and which will therefore act as formers for part of the length of such tapered portions; but such mandrels are not necessary, it being found that evenly-tapered tubes may be formed without them.

In the practice of the invention we find that tapered tubes may be drawn out so as to form a tube at least one-third longer than the tapered portions subjected to the drawing strain. For example, where twelve feet of pipe are subjected to such action it may be drawn out to sixteen feet or more. At the same time the drawing action reduces the thickness of the metal as it reduces the diameter, and the tube produced is not only of greater length, but of gradually thinned walls, so overcoming the objection to tapered tubes formed by the ordinary swaging process and giving a much more desirable tube, while by the greater length obtained and the disposing of the metal in the manner above described the cost of the tube in proportion to its length is very materially reduced.

I have described the above apparatus suited for practicing the invention, but it is to be understood that I include within the same the method above described when practiced with any apparatus suitable for the purpose.

What I claim as my invention, and desire to secure by Letters Patent, is—

1. The herein-described method of forming tapered wrought metal tubing, consisting in grasping a heated tube at two different points and drawing the same out and thereby tapering or reducing it in diameter and elongating the same, substantially as and for the purposes set forth.

2. The herein-described method of forming tapered wrought metal tubing, consisting in grasping a heated tube at two different points and around an internal tapering former or mandrel, and drawing out the tube and thereby tapering and reducing the same in diameter and elongating it, substantially as set forth.

3. The herein-described method of forming and tapering wrought metal tubing, consisting in grasping a heated tube at two different points and around a suitable tapering former or mandrel which is suitably cooled and drawing out the tube and thereby tapering and elongating it, and during the drawing operation setting the tube around the mandrel, substantially as and for the purposes set forth.

4. The herein-described method of forming tapered wrought metal tubing, consisting in grasping a heated tube at two different points and drawing out the same and so tapering and elongating the same in both directions from the points at which it is grasped, permitting it to cool, and then cutting the tube at the point of smallest diameter to form two tapered tubes, substantially as set forth.

5. In apparatus for forming tapered wrought metal tubing, the combination of two clamping devices for grasping the tubing, mandrels entering within the tubing at points where the same is grasped, and a tapering former entering within the tube in the space between the clamps, said clamps being movable one from the other, substantially as and for the purposes set forth.

6. In apparatus for forming tapered wrought metal tubing, the combination of two clamping devices for grasping the tubing, mandrels entering within the tubing at points where the same is grasped, and a tapering former entering within the tube in the space between the clamps, said former being formed hollow and having connections to feed a cooling fluid thereto, substantially as and for the purposes set forth.

7. In apparatus for forming tapered wrought metal tubing, the combination of two clamping devices to grasp the tubing at suitable points, said clamps being movable one from the other, an annular mandrel entering within the tube at one clamp and a mandrel or former entering the tube within the other clamp, and having a tapered portion extending through the tube between the clamps and passing through the annular mandrel of one clamp, substantially as and for the purposes set forth.

8. In apparatus for forming tapered wrought metal tubing, the combination of two clamps for grasping the tubing at different points, one of said clamps having clamping jaws, and an annular mandrel adapted to enter within the tube between the jaws, said annular mandrel being vertically movable, and being suspended from the clamp by straps, substantially as and for the purposes set forth.

9. In apparatus for forming tapered wrought metal tubing, the combination of two clamping devices adapted to engage the tubing at different points, and a mandrel or former having a straight portion to receive the body of the tube not acted upon, and a tapered portion extending out in the space between the clamps, substantially as and for the purposes set forth.

10. In apparatus for forming tapered wrought metal tubing, the combination of two clamping devices adapted to engage the tubing at different points, a carriage supporting one of said clamps, a hydraulic cylinder provided with a piston having a hollow piston rod, and a bar connected to the carriage and passing through such hollow piston rod and adapted to be connected thereto, substantially as and for the purposes set forth.

11. In apparatus for forming tapered wrought metal tubing, the combination of two clamping devices adapted to engage the tubing at different points, a carriage supporting one of said clamps, a hydraulic cylinder provided with a piston having a hollow piston rod, a bar connected to the carriage and passing through such hollow piston rod and adapted to be connected thereto, and operating rolls engaging with such bar to move the same, substantially as and for the purposes set forth.

In testimony whereof I, the said WILLIAM JACKSON, have hereunto set my hand.

WILLIAM JACKSON.

Witnesses:
J. N. COOKE,
W. C. COOKE.